United States Patent [19]
Heinemann et al.

[11] 3,745,667
[45] July 17, 1973

[54] COOLING APPARATUS AND METHOD

[75] Inventors: Otto Heinemann; Manfred Schefer, both of Ennigerloh; Werner Schossler; Rainer Philipp, both of Ahlen, all of Germany

[73] Assignee: Polysius AG, Neubeckum, Germany

[22] Filed: Apr. 17, 1972

[21] Appl. No.: 244,381

[30] Foreign Application Priority Data
Apr. 20, 1971 Germany.................. P 21 19 006.7

[52] U.S. Cl.......................... 34/20, 432/80, 34/64, 34/54
[51] Int. Cl............................................ F26b 7/00
[58] Field of Search .................... 34/20, 51, 52, 54, 34/63, 109, 170, 62, 56; 432/80, 47, 48

[56] References Cited
UNITED STATES PATENTS

| | | | |
|---|---|---|---|
| 3,397,460 | 8/1968 | Hall | 34/20 |
| 3,372,742 | 3/1968 | Forner | 34/52 |
| 3,358,977 | 12/1967 | Jensen | 432/80 |
| 2,287,300 | 6/1942 | Eiben | 34/109 |
| 2,377,943 | 6/1945 | Kennedy | 34/20 X |
| 2,084,976 | 6/1937 | Puerner | 34/52 |
| 1,830,959 | 11/1931 | Petersen | 34/109 |

FOREIGN PATENTS OR APPLICATIONS

| | | | |
|---|---|---|---|
| 88,011 | 8/1896 | Germany | 34/52 |

Primary Examiner—William F. O'Dea
Assistant Examiner—William C. Anderson
Attorney—John F. Learman, John K. McCullouch et al.

[57] ABSTRACT

Apparatus and method of cooling material, such as furnace fired clinkers, including apparatus for passing the same amount of cooling air through material in a secondary cooling stage and a primary cooling stage, and apparatus for controlling the amount of cooling air in accordance with the air pressure in the primary cooling stage and the amount and temperature of material in the secondary stage.

9 Claims, 3 Drawing Figures

COOLING APPARATUS AND METHOD

This invention relates to a method and apparatus for cooling material, especially cement clinker, fired in a furnace system, in a primary cooling stage and a secondary cooling stage by means of air which is later communicated to the furnace system as secondary air.

In order to cool the fired cement clinker emerging from a furnace system to a suitable end temperature, it is generally known to feed a relatively large amount of cooling air through the clinker, generally in counterflow to the flow path of this material. Only part of the cooling air, which is thereby heated, can be fed into the furnace system as secondary air, while the other part is often emitted into the atmosphere. Because of the relatively high temperature of the air being exhausted to atmosphere and because the exhausted air must be substantially dust-free, particularly extensive and expensive equipment must be employed to purify this air before it is exhausted to atmosphere.

A method is also known wherein the fired clinker is cooled by continuously sequentially passing air through a primary cooling stage and then through a secondary cooling stage. In the primary cooling stage the clinker is brought directly into contact with cooling air which is then generally fed as secondary air into the furnace system. In the secondary cooling stage however, the cooling of the clinker is effected indirectly and/or by heat radiation. In order to achieve adequate cooling of the clinker to the required end temperature in this known method, either a relatively large amount of air must be fed to the primary cooling stage, or the secondary cooling stage must have a relatively large heat conducting surface. Since the air heated in the primary cooling stage is meant to be fed as secondary air to the furnace system, and this system only needs a limited amount of secondary air, the secondary cooling stage must therefore be made relatively large, i.e. provided with a very large heat conducting surface, and this results in undesirably high costs.

The primary object of the invention is therefore to provide a method and apparatus of the type initially described wherein extremely effective cooling of the fired material to the desired end temperature is insured with relatively low space requirements and without emitting the cooling air into the atmosphere.

According to the invention, this object is achieved by feeding the entire amount of cooling air used in the secondary cooling stage for the direct cooling of the material through the primary cooling stage, and then to the furnace system, and by controlling the amount of cooling air in dependence on the air pressure in the primary cooling stage and the throughput, or level of the material, in the secondary cooling stage, for the purpose of providing uniform filling of the secondary cooling stage with material, and the maintenance of the required end temperature of the material.

With the method provided by the invention, the air pressure in the primary cooling stage, the amount of material in the secondary cooling stage, and the end temperature of the cooled product are individually monitored. With the continuous monitoring of these values, and with the corresponding associated control of the amount of cooled material to be withdrawn and of the amount of cooling air to be supplied, particularly effective cooling of the material can be achieved. The total amount of air fed to the two cooling systems is only as much as can be used as secondary air in the cooling system. None of the air heated in the course of cooling the material need therefore be emitted into the atmosphere, making expensive dust-removal equipment unnecessary. Since with the method provided by the invention the material to be cooled is also cooled directly in the secondary cooling stage, and before its removal is kept in this secondary cooling stage long enough to reach its desired end temperature, a device suitable for carrying out the method of the invention can be made with relatively efficient usage of space.

A device of this type for carrying out the method of the invention comprises a primary cooler and a secondary cooler downstream of the furnace system to which the air removed from the primary and secondary coolers is fed as secondary air. In such a device in accordance with the invention it is desirable if the secondary cooler which is downstream of the primary cooler, is connected to a conduit which conveys the total amount of cooling air from the secondary cooler to the primary cooler. A throttle valve is provided in this conduit and is connected to control means actuable by the air pressure in the primary cooler. The secondary cooler has several closable outlets which can be controlled by a temperature-measuring device and a device for measuring the degree of fullness or height of material therein.

According to a further advantageous embodiment of the invention, the temperature-measuring device and the device for measuring the degree of fullness are connected together by a timing circuit whereby the temperature-measuring device can be switched off when the secondary cooler is filled to a maximum level. By this means in particular, any larger impacts of material that may arise can be processed through the secondary cooler, without the secondary cooler having to be designed excessively large.

The method in accordance with the invention, and two devices suitable for carrying out the method are described below in relation to the drawings. In these:

FIGS. 1 and 2 show in purely schematic form a first embodiment of a device in accordance with the invention for cooling material which has been fired in a furnace system. This device is used for performing the method of the invention, which will be described in association with the device.

Figure 1:
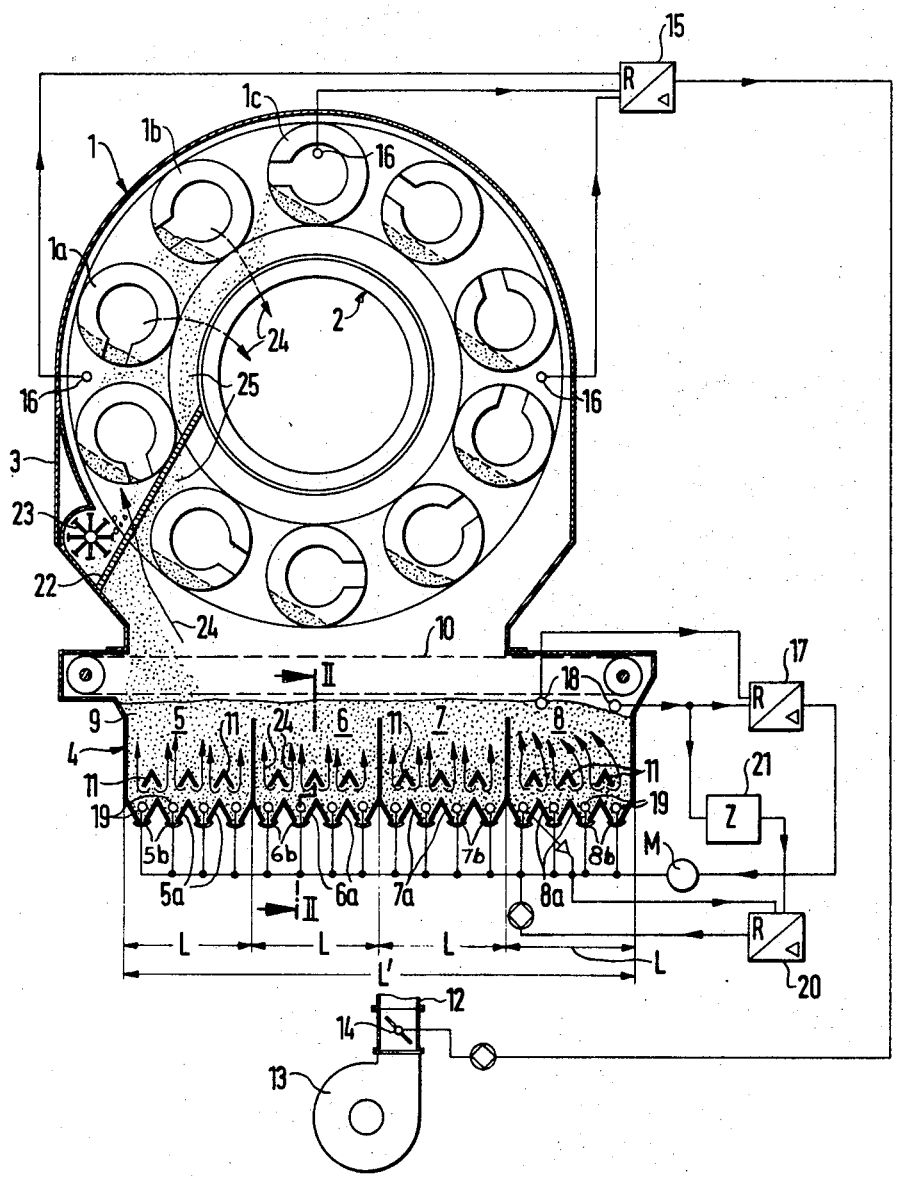
FIG. 1 is a schematic, sectional side view of a first embodiment in accordance with the invention, including a rotary kiln planetary cooler and a secondary cooler disposed therebelow.

As seen from FIG. 1, the primary cooler in this embodiment comprises a satellite or planetary cooler 1 of usual construction, including individual cooling tubes, eg 1a, 1b, 1c disposed in a concentric ring about the outlet end of a rotary kiln 2. The outlet housing 3 of this planetary cooler 1 is joined at the bottom to a secondary cooler 4.

In this embodiment the secondary cooler 4 consists of a plurality of parallelly disposed similar cooler sections 5, 6, 7, 8 openings toward the planetary cooler 1 and the exit 3 thereof. Above the individual sections 5 – 8, the secondary cooler 4 contains a material feed chamber 9 which connects together the sections. In the upper part of the material feed chamber 9, there is disposed a drag chain 10, whose lower run distributes, uniformly over the individual secondary cooling sections 5 – 8, the material 25 dropping out of the primary cooler 1. Each secondary cooling section 5 – 8 has a number of outlets 5a, 6a, 7a, 8a which can be closed or opened by barrier members such as pivot valves 5b, 6b, 7b and 8b.

Figure 2:
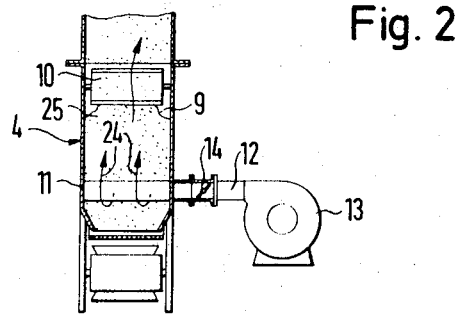
FIG. 2 is a sectional end view through the secondary cooler on the line 2—2 in FIG. 1.

In the lower part of the sections 5 – 8 of the secondary cooler 4 uniformly distributed sheds 11 are provided and pass through the secondary cooler in the transverse direction (see FIG. 2). These sheds 11 are connected to a common feed conduit 12 which is joined to a blower for producing the cooling air stream. The conduit 12 contains a throttle valve 14 which is connected to control means 15 used to control the position of the throttle valve 14 and which can be actuated by the air pressure in the planetary or primary cooler 1. The planetary cooler 1 is provided with a plurality of circumferentially spaced air pressure measuring elements 16. The air pressure measurements of the elements 16 are fed to the control means 15 for evaluation and thus for the purpose of controlling the cooling air supply.

The secondary air cooler 4 also has a device 17 for measuring the degree of fullness, or the amount of material therein, connected firstly to fullness or depth measuring elements 18 and secondly to the individual barrier members 5b, 6b, 7b and 8b at the secondary cooler outlets. The fullness measuring elements 18 are preferably so situated that they respond to the conditions of maximum and minimum fullness, whereby via the measuring device 17 the barrier elements 5b, 6b, 7b and 8b at the secondary cooler outlets 5a, 6a, 7a, 8a can be correspondingly opened or closed.

In the vicinity of each secondary cooler outlet 5a, 6a, 7a, 8a there is also mounted a temperature-measuring element 19 whose measurement is fed to a temperature measuring device 20 which can also open or close the corresponding barrier elements 5b, 6b, 7b and 8b at the secondary cooler outlets according to the material temperature determined. The device 17 for measuring the degree of fullness, and the temperature measuring device 20 are also connected together by a timing circuit 21 whereby the temperature measuring device 20 can be switched off when a maximum filling of the secondary cooler 4 has been reached or exceeded. The secondary cooler 4 itself is generally made so large that relatively slow cooling of the clinker by directly supplying cooling air is achieved.

In the design of the planetary cooler 1 it will in general be desirable if some type of reducing device is provided in the areas of outlet of material from the individual cooling tubes. For this reason, the cooler 1 includes an inclined grate 22 having a rotary reducing device 23 disposed above its lower area. In general the length L' of the secondary air cooler is equal to the sum of the lengths L of the desired number of individual sections.

The process sequence in the cooling of, for example, cement clinker by the device described above according to the invention is as follows. The entire amount of air used for cooling the cement clinker is produced by the blower 13 and fed through the cooling air feed conduit 12 to the sheds 11 in the lower part of the secondary cooler 4. From there the cooling air, widely distributed, passes directly into the cement clinker 25 collected therein. All the cooling air flows upwardly through the secondary cooler 4 and enters the primary cooler housing 3 as indicated by the arrows 24. The cooling air then passes through the cooling pipes 1a, 1b and 1c in the planetary cooler 1 and is then fed as secondary air into the rotary kiln 2 (see arrows 24). No preheated cooling air therefore needs to be branched off as exhaust air and cleaned of dust at considerable expense.

The cement clinker 25 to be cooled moves in approximate counterflow to the cooling air (arrow 24). The cement clinker 25 emerges from the outlet end of the rotary kiln 2, is cooled in known manner in the planetary cooler 1, and then passes through the outlet housing 3 (in which further reduction takes place) into the secondary cooler 4. By means of the material feed chamber 9 and with the aid of the drag chain 10, the cement clinker 25 is distributed uniformly to the individual sections 5, 6, 7 and 8 of the secondary cooler 4. In order that the cooling air supplied can be uniformly effective in all the secondary cooler sections, the barrier elements 5b, 6b, 7b and 8b at the secondary cooler outlets remain closed until a minimum degree of fullness is reached and is indicated by the lowermost fullness element 18 as indicated in FIG. 4. Only when the desired final clinker temperature has been reached are some or all of the barrier elements 5b, 6b, 7b and 8b opened under the control of the device 17 for measuring the degree of fullness or of the temperature-measuring device 20. The barrier elements 5b, 6b, 7b and 8b of the individual secondary cooling outlets 5a, 6a, 7a and 8a can if necessary, when control is effected by the fullness measuring device 17, be actuated jointly by the motor M. The material removed is conveyed away by suitable transport means (see FIGS. 2 and 3). In general this control will suffice for the purpose of uniformly filling the secondary cooler with material and of maintaining the required final temperature of the material during operation of this device provided by the invention. However, in order to avoid any possible overfilling of the secondary cooler 4 (which could be caused by sudden major loads), the temperature-measuring device and the device for measuring fullness are connected together by the timing member 21 in such manner that the temperature-measuring device 20 can be switched off if the maximum condition of the secondary cooler has been reached or exceeded; in this exceptional case the secondary cooler 4 can be emptied somewhat faster, without the final clinker temperature being reached.

In the operation of the cooling device provided by the invention, wherein the clinker 25, both in the secondary cooler 4 and in the primary cooler 1 is direclty cooled with air which is completely supplied as secondary air to the rotary kiln 2, it is particularly important that only as much air be supplied to the rotary kiln 2 as is needed for secondary air. This objective is achieved by the control device 15, whose air-pressure measuring elements constantly monitor the air pressure in the primary cooler 1 and control accordingly the supply of air to secondary cooler 4. This means that the cooling air supply through the conduit 12 is throttled by the throttle valve 14 when the air pressure rises in the primary cooler 1 (that is when somewhat too much secondary air is supplied to the rotary kiln 2), and vice versa.

Figure 3:
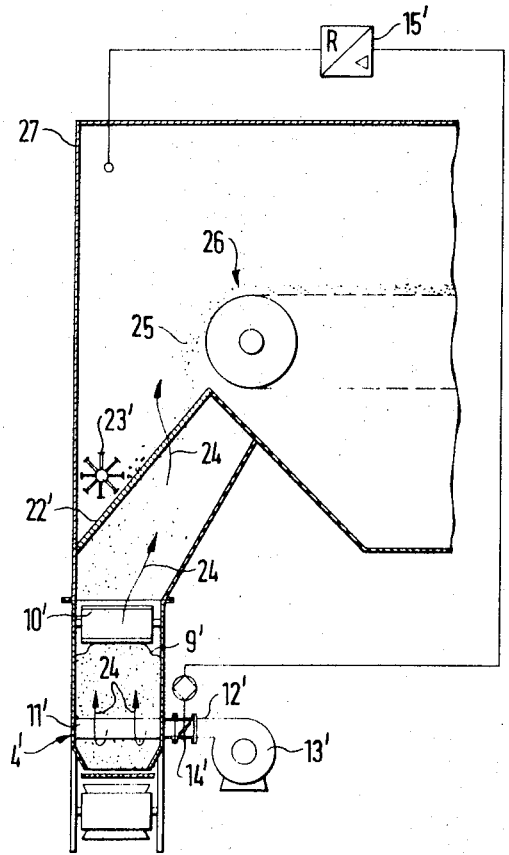
FIG. 3 is a schematic view of a second embodiment of the invention, including a grate cooler and a secondary cooler disposed therebelow.

In the second embodiment of the invention shown in FIG. 3, the primary cooler consists of a grid cooler 26 which is surrounded by a housing 27. The outlet of the housing 27 is joined to the material feed chamber 9' of a secondary cooler 4', which is constructed in the same way as the first example in FIGS. 1 and 2.

This device provided in accordance with the invention for cooling fired material, especially cement clinker, can also be connected beyond a rotary kiln or any other suitable furnace system. In the same way as in the first embodiment, there are again provided a control device 15 for controlling the total amount of cooling air fed to the secondary cooler in dependence on the air pressure in the primary cooler, together with a temperature measuring device and a device (not shown in detail) for measuring the state of fullness, by which the secondary cooler 4' (secondary cooling stage) can be controlled to provide uniform filling with material and maintenance of the required final clinker temperature. The temperature-measuring device and the fullness measuring device are again connected together by a timing circuit, so that the temperature measuring device can be switched off on maximum filling of the secondary cooler 4' with material.

The functioning of this device corresponds otherwise to that described for the first embodiment in relation to FIGS. 1 and 2. It is self-evident finally that any suitable cooler can be provided as the primary cooler after a furnace system.

The disclosed embodiment is representative of presently preferred forms of the invention but is intended to be illustrative rather than definitive thereof. The invention is defined in the claims.

What we claim is:

1. A method for cooling material, especially cement clinker, fired in a furnace system in a primary cooling stage and a secondary cooling stage comprising the steps of: passing cooling air through the secondary cooling stage to directly cool the material in the secondary stage; feeding the entire amount of cooling air used in the secondary cooling stage for the direct cooling of the material through the primary cooling stage, and controlling the amount of cooling air in dependence on the air pressure in the primary cooling stage and the level of material in the secondary cooling stage for providing uniform filling of the secondary cooling stage with material and maintaining the required end temperature of the material.

2. The method as in claim 1 wherein the cooling air in the lower portion of the secondary cooling stage is distributed uniformly at various places directly into the material.

3. Apparatus for cooling material, especially cement clinker, fired in a furnace system comprising: a primary cooler for receiving and partially cooling the material; a secondary cooler for receiving and further cooling the partially cooled material; means for passing cooling air through the material in the secondary cooler to cool the material therein; means for feeding the entire amount of cooling air used in the secondary cooling stage for the direct cooling of the material through the primary cooler and then to the furnace system; and means for controlling the amount of cooling air supplied in accordance with the air pressure in the primary cooling stage and the level of the material in the secondary cooling stage for providing uniform filling of the secondary cooler with material, and maintaining the required end temperature of the material.

4. The apparatus set forth in claim 3 including a conduit connecting the secondary cooler and the primary cooler for conveying the total amount of cooling air therebetween, a throttle valve in said conduit; control means, actuable by the air pressure in the primary cooler, for controlling said throttle valve, said secondary cooler including a plurality of closable outlets; and means responsive to the temperature and amount of material in said secondary cooler for opening and closing said outlets.

5. The apparatus set forth in claim 4 wherein said secondary cooler has a number of similarly formed sections disposed in parallel, and open to the primary cooler.

6. The apparatus set forth in claim 5 wherein the sections of the secondary cooler lie in sequence and are connected to a common material feed chamber including a drag chain.

7. The apparatus set forth in claim 6 wherein each secondary cooling section has a number of outlets; said means for opening and closing said outlets comprises a plurality of individually controlled barrier elements, temperature measuring means for measuring the temperature of the material in the secondary cooler, means for sensing the level of material in said secondary cooler, and means responsive to said temperature measuring means and said level sensing means for controlling the positions of said barrier elements.

8. The apparatus set forth in claim 4 wherein said responsive means includes a temperature measuring device and a fullness measuring device connected together by a timing circuit, whereby the temperature measuring device can be switched off and on to provide maximum filling of the secondary cooler with material.

9. The apparatus set forth in claim 4 including a material reducing device between the primary cooler and the secondary cooler.

* * * * *